United States Patent [19]

Braun

[11] Patent Number: 4,494,024

[45] Date of Patent: Jan. 15, 1985

[54] ONE SHOT SPRING ACTIVATED MOTOR

[75] Inventor: Gerald W. Braun, Avilla, Ind.

[73] Assignee: Magnavox Government and Industrial Electronics Company, Fort Wayne, Ind.

[21] Appl. No.: 555,517

[22] Filed: Nov. 28, 1983

[51] Int. Cl.³ .................. H02K 7/00; H01H 29/00
[52] U.S. Cl. ...................... 310/75 A; 200/61.08; 310/273
[58] Field of Search ............ 74/2; 200/61.04, 61.05, 200/61.08; 337/4, 273; 310/75 A

[56] References Cited

U.S. PATENT DOCUMENTS

| | | | |
|---|---|---|---|
| 2,440,861 | 5/1948 | Lamb | 337/4 |
| 3,567,880 | 3/1971 | Palmer et al. | 200/61.08 |
| 4,240,300 | 12/1980 | Tanaka | 74/2 |
| 4,384,185 | 5/1983 | Hall et al. | 200/61.08 |

Primary Examiner—William H. Beha, Jr.
Assistant Examiner—D. L. Rebsch
Attorney, Agent, or Firm—Thomas A. Briody; William J. Streeter; Richard T. Seeger

[57] ABSTRACT

A motor shaft is inserted through the center of a first and second coil spring. A first end of each spring is attached to the motor shaft and the second end is wound against its respective spring force and tied to the motor housing by a respective heat severable cord which is wound about a respective heater element. The first spring places a clockwise torque on the shaft and the second spring places a counterclockwise torque on the shaft. Each heater element may be selectively heated as by flow of electrical current, to heat a selected one element and heat sever its respective cord to release the torque on the second end of a respective one spring to rotate the shaft under the torque of the other spring.

12 Claims, 8 Drawing Figures

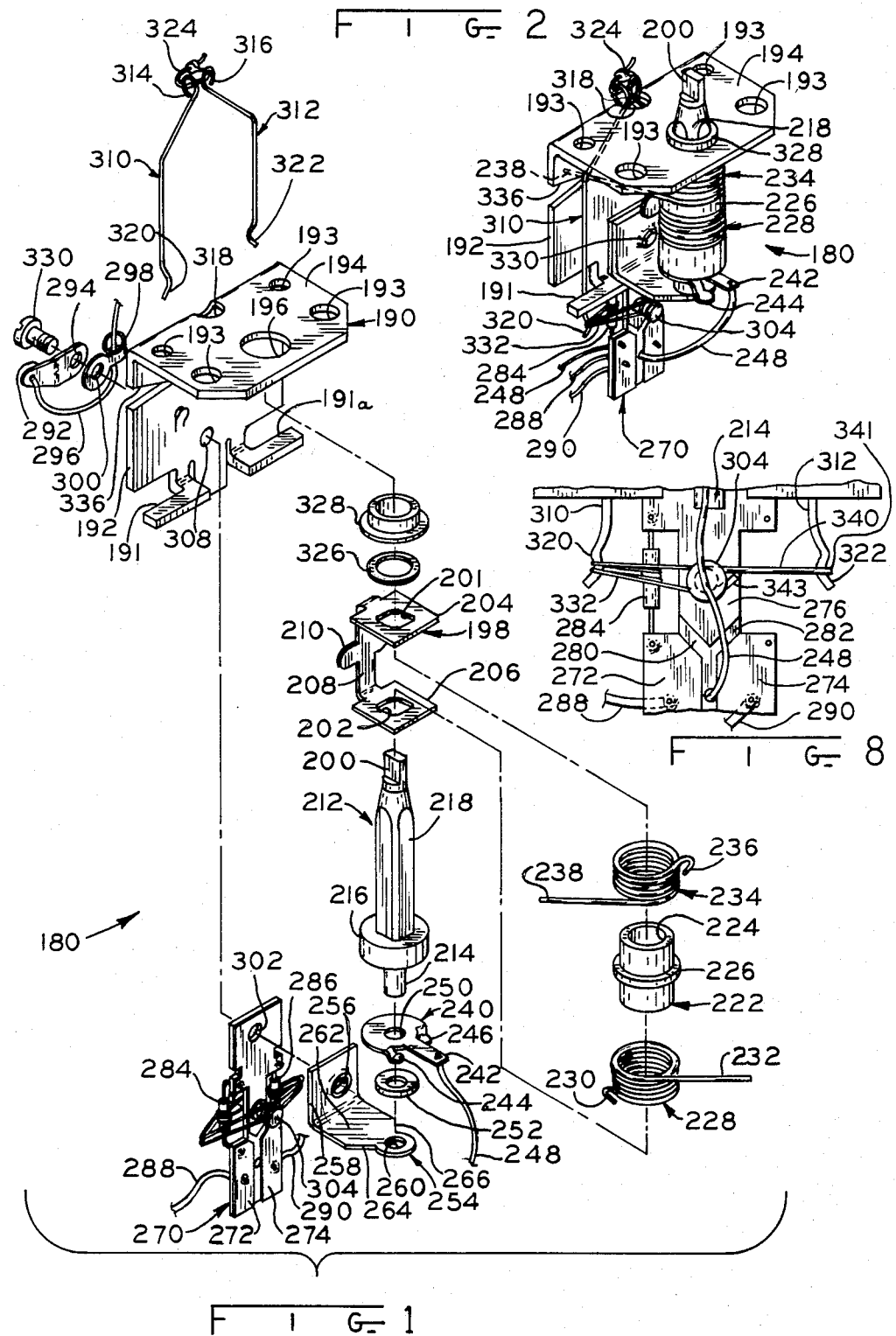

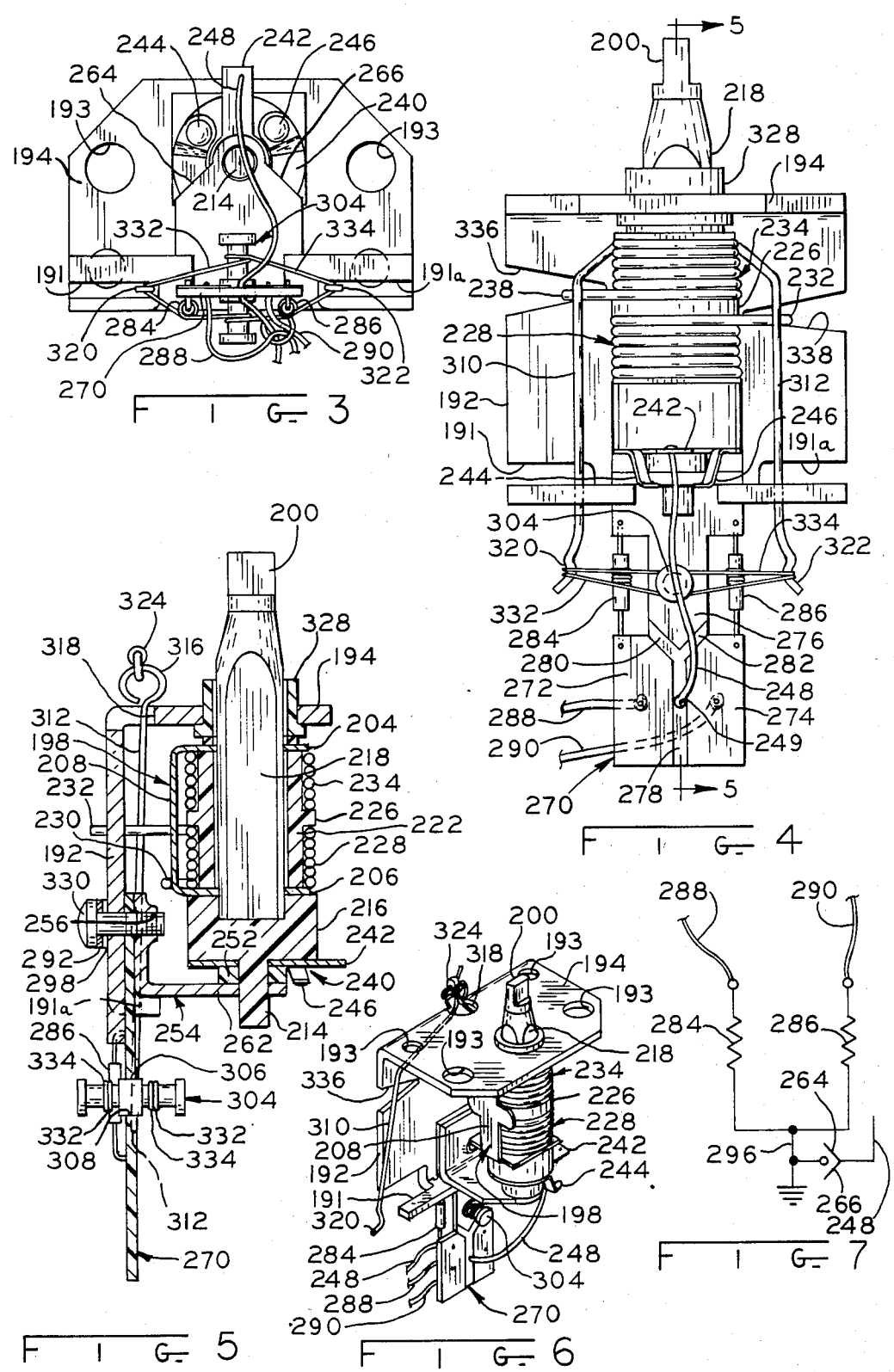

ONE SHOT SPRING ACTIVATED MOTOR

BACKGROUND OF THE INVENTION

1. Field of the Invention

This invention relates to motors having spring driven shafts and includes a spring driven motor capable of bidirectional shaft rotation.

2. Brief Statement of the Prior Art

Spring driven motors are common, one such motor being that which is utilized in the well known mouse trap wherein a bait lever releasably latches the end of a pivoted rod in retaining position above a U-shaped trap member against a spring force applied to the member. Movement of the lever dislodges the lever from the rod end releasing the trap member which then swings about the pivoted U arm ends under the spring force.

This and other similar type motors utilize mechanical or electrical latches that are sensitive to mechanical motion, require relatively expensive latch mechanisms, are subject to corrosion and/or are not completely reliable in operation. Also many such motors are not capable of bidirectional rotative movement.

SUMMARY OF THE INVENTION

This invention provides a relatively inexpensive and highly reliable "one shot" spring motor. The motor has a rotatable vertical shaft, to which is attached for rotation a vertical elongated spring end retaining bar. The shaft is inserted through the coils of upper and lower coil springs, each having a hooked end that is hooked about a longitudinal edge of the bar, the end of the upper spring hooked about one longitudinal edge and the end of the lower spring hooked about the opposite longitudinal edge of the bar. The other end of the upper spring is held against the upper spring force by a strong, flexible, heat severable first cord, such as polypropylene, which is wound about a first heater element, to exert a clockwise torque on the bar and the shaft. The other end of the lower spring is held against the lower spring force by a similar second cord which is wound about a second heater element, to exert a counterclockwise torque on the bar and shaft. The springs have substantially equal forces so that the shaft is substantially torsionally balanced. To rotationally actuate the shaft in a clockwise direction, current is applied to the second heater element which heat severs the second cord, releasing the counterclockwise torque on the bar and shaft. The shaft turns clockwise through an arc until the other end of the lower spring abuts a stop, the arc in the disclosed embodiment being approximately 135°. In similar manner, to rotationally actuate the shaft in a counterclockwise direction, current is applied to the first heater element which heat severs the first cord, releasing the clockwise torque on the bar and shaft until the other end of the upper spring abuts a stop, again the arc in the disclosed embodiment being approximately 135°. Where it is only necessary to rotate the motor in one direction, the other end of one of the springs is affixed to the motor housing and therefore only one heater element and one heat severable cord are required, those being for the other end of the other spring. Further, several stops may be provided for each spring and the stops may be selectively and successively removed to provide a multiple and/or variable arc of shaft rotation.

An object of this invention is to provide a relatively inexpensive highly reliable spring driven motor.

A further object of this invention is to provide a motor of the previous object which may be selectively actuated to turn a motor shaft in the clockwise and counterclockwise directions.

A still further object of this invention is to provide a motor of the previous object wherein two coil springs exert substantially equal and opposite torques on a motor shaft, thus placing the shaft in substantial torsional balance, and one or either spring may be selectively released by heat severing of a cord by a heater element.

The above mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

FIG. 1 is an exploded view in perspective of a "one shot" spring motor used in this invention;

FIG. 2 is an assembled view in perspective of the spring motor of FIG. 1 in the cocked position;

FIG. 3 is a bottom plan view of the motor in FIG. 2;

FIG. 4 is a front elevation view of the motor of FIG. 2;

FIG. 5 is a section taken at 5—5 of FIG. 4;

FIG. 6 is a view in perspective of the motor of FIG. 2 in sprung position;

FIG. 7 is a schematic diagram of the electrical circuit for the heater resistor elements of the motor of FIG. 2; and FIG. 8 is a partial front elevational view of a modified motor operable for rotation in one direction only.

DESCRIPTION OF A PREFERRED EMBODIMENT

Referring now to FIGS. 1-7 "L-shaped" bracket 190 has vertical plate 192 and horizontal plate 194. Horizontally extending offset guide slots 191, 191a are formed at the lower end of vertical plate 192, and mounting holes 193, and motor shaft opening 196 are formed in horizontal plate 194. A bolt, not shown, is inserted through each hole 193 for securing plate 194 to four extension posts 195, FIG. 7, which in turn are fastened to the underside of the top end of canister 30 so that motor shaft opening 196 is aligned with opening 184. "C-shaped" spring retainer 198 has substantially square openings 201, 202 formed in upper and lower horizontal arms 204, 206 respectively which are connected by vertical arm or bar 208 having a central laterally oriented cross member 210. Motor shaft 212 has pivot pin 214 at its lower end, cylindrical base 216, square post section 218 and key 200 at its upper end. Elongated tubular spool 222 with bore 224 has annular flange 226 intermediate its length. The lower end of spool 222 is inserted into lower coil spring 228 having hooked end 230 and laterally extending end 232. The upper end of spool 222 is inserted into coil spring 234 having hooked end 236 and laterally extending end 238, springs 228, 234 abutting and separated by flange 226.

Contact ring 240 has finger 242 and a pair of resilient electrical stepped contact tabs 244, 246 on either side of finger 242. Insulated conductive lead 248 is electrically coupled to the end of finger 242. Opening 250 is formed centrally of ring 240. Washer 252 is made of an insulative material. Conductive "L-shaped" bracket 254 has threaded opening 256 in its vertical arm 258 and opening 260 in its horizontal arm 262. Arm 262 has chamfered edges 264, 266.

Printed circuit board 270 has conductive sections 272, 274, 276 which are electrically insulated from one another by insulative strips 278, 280, 282. Hole 249 is formed in strip 278 for passage of lead 248 through board 270. Heater elements 284, 286 may be ⅛ watt, wire wound 20 ohm value, of a type manufactured by Dale Electronics, and are electrically coupled to board 270 such that element 284 is coupled between sections 272, 276 and element 286 is coupled between sections 274, 276. Insulated conductive leads 288, 290 are electrically connected to sections 272, 274 respectively. Conductive connector 292 has hole 294 and is electrically connected to lead 296 which, as will become apparent, is electrically connected through connector 292 to section 276. Flexible non resilient harness strap 298 has hole 300 at one end and is curled at the other end to form a harness through which leads 248, 288, 290, 296 are passed to guide them to control circuitry, not shown, in the sonobuoy 20. Board 270 has mounting hole 302 at its upper end. Elongated post 304 is headed at each end and has a central annular flange 306 fitting snugly in hole 308 in board 270 to which post 304 is affixed. Retaining arms 310, 312 have looped ends 314, 316 respectively, each of which is inserted through hole 318 in plate 194, and notches 320, 322 respectively formed in their respective other ends.

In assembly of motor 180, springs 230, 234 are installed on spool 222 with hooked ends 230, 236 hooked around opposite edges of arm 208. Shaft 212 is inserted through lower retainer hole 202 and spool opening 224. Shaft 212 is then inserted through upper retainer opening 201, washer 326, flanged bushing 328 and plate opening 196. Contact ring 240, washer 252 and bracket hole 260 are placed over pin 214 and bracket 254 is placed over board 270 with holes 256, 302, 308 being aligned. Threaded screw 330 is then inserted through connector opening 294, harness opening 300, holes 308, 302 and threaded into opening 256 to attach board 270 and bracket 254 to bracket 190. Flexible tie strap 324 is passed through looped ends 314, 316 of arms 310, 312, respectively, and tied. Retainer arms 310, 312, tied together with strap 324, are inserted through hole 318.

Looped cords 332, 334 are of a strong, flexible, relatively low heat severance point material such as polypropylene, 84 dinier in four strands with a break strength at room temperature of ten pounds and a melting temperature of 250° F. or above. Such cords are available from Synthetic Thread Co. of Bethlehem, Pa. Heat severance may be by melting, combustion, or other heat destruction of cords 332, 334. Arm 310 is placed in and moved rightwardly in slot 191 and is levered over spring end 238 forcing it inwardly into notch 336 thus winding or coiling spring 234 to place a clockwise spring force on arm 208 as viewed from the top of motor 180 and a clockwise torque on shaft 212. Cord 332 is looped around post 304 on one side of board 270, hooked in notch 320, is wrapped around element 284 and then looped over post 304 on the other side of board 270.

Arm 312 is placed in and moved leftwardly in slot 191a and is levered over spring end 232 forcing it inwardly into "V" notch 338 thus winding or coiling spring 228 to place a counterclockwise spring force on arm 208 as viewed from the top of motor 180 and a counterclockwise torque on shaft 212. Cord 334 is looped around post 304 on one side of board 270, hooked in "V" notch 322, is wrapped around element 286 and then looped over post 304 on the other side of board 270.

Thus springs 230, 234 place substantially equal and opposite balanced torque forces on shaft 212, minimizing its torsional stress, in the cocked position of motor as shown in FIG. 1. Key 200 is inserted in a keyway of a member, not shown, to be rotationally driven. If arm 310 is released, shaft 212 and the driven member will be rotationally driven in a counterclockwise direction, as viewed from above, until spring end 238 strikes plate 192 and/or arm 312. If arm 312 is released, shaft 212 and the driven member will be rotationally driven in a clockwise direction until spring end 230 strikes plate 192 and/or arm 310. Rotation of shaft 212 is thus selectively obtained in either direction by the arcuate distance of this embodiment, which is approximately 135°.

To accomplish release of arm 310 a voltage difference between leads 288, 296 of approximately 6–7 volts DC is applied by control circuitry, not shown, when sonobuoy 20 is immersed in salt water by flooding a salt water activated battery, not shown, with sea water electrolyte as is known in the art. Element 284 thus is provided with an electrical current that raises its temperature to approximately the above mentioned melt temperature of 250° F. or above to heat sever cord 332 in less than two seconds. To release arm 312 the aforementioned voltage difference is applied between leads 290, 296 and across element 286 to heat sever cord 334.

Referring to FIG. 6, motor 180 is shown sprung in the counterclockwise direction. Voltage applied to element 284 heat severs cord 332 releasing arm 310 which moves outwardly in slot 191 releasing end 238 rotationally driving shaft 212 and key 200 approximately 135° in the counterclockwise direction.

When shaft 212 is rotated in the clockwise direction, tab 244 rides up and over edge 264 to make electrical contact with arm 262 which is in electrical contact with section 276 and when shaft 212 is rotated in the counterclockwise direction, tab 246 rides up and over edge 266 to make electrical contact with arm 262. Thus the potential on lead 248 is that of lead 296, which typically is at ground potential, to signal to the control circuitry that the motor has operated successfully. The electrical circuitry thus described and for heating and heat severing cords 332, 334 is shown schematically in FIG. 7.

As is evident from the above description, motor 180 need only be actuated in one rotational direction for the purposes of this invention. Only one of the cords 332, 334 and only one corresponding heater element 284, 286 are needed. Referring to the partial view in FIG. 8, a "one direction" modification of motor 180 is shown. Cord 334 and element 286 are replaced by a sturdy wire 340 which at one end 341 is looped around notch 322 of arm 312 and at the other end 343 is looped around post 304 thus permanently securing arm 312 to post 304 and maintaining counterclockwise spring torque on shaft 212. Applying current to element 284 heat severs cord 332, causing shaft 212 to rotate in the counterclockwise direction. The reference numerals in FIG. 8 refer to parts as previously described and the motor of FIG. 8 is the same otherwise to that described and shown in FIGS. 1-6. In the circuit diagram of FIG. 7 lead 290 and element 286 would be deleted for the modification described and shown in FIG. 8. Multiple rotational stops in either direction may be achieved by multiple retaining wires each having its own heat severable cord.

Other modifications may be made without departing from the scope of this invention.

While there have been described above the principles of this invention in connection with specific embodiments, it is to be understood that this is by way of example and is not limiting of the scope of this invention.

What is claimed is:

1. Motor apparatus comprising
    an elongated motor shaft having a shaft axis;
    first means for supporting said shaft for rotation from an initial rotative position about said axis;
    second mechanical means for applying a first torque in a first rotational direction from said initial rotative position to said shaft;
    third mechanical means for applying a second torque in a second rotational direction from said initial rotative position to said shaft;
    fourth means for selectively releasing the torque of one of said second and third means to impart rotation to said shaft in either said first and second rotational directions from said initial rotative position.

2. The apparatus of claim 1 wherein said second and third means each apply a spring torque to said shaft.

3. The apparatus of claim 1 wherein said fourth means comprises first and second heater elements mounted in fixed relation to said first means, each heater element adapted to be heated selectively; a first flexible heat severable cord attached between said first means and said second means for maintaining said first torque on said shaft; a second flexible heat severable cord attached between said first means and said third means for maintaining said second torque on said shaft;
    said first cord being in close proximity to said first heater element and said second cord being in close proximity to said second heater element whereby when said first element is heated said first cord will be heat severed releasing said first torque whereby said second torque imparts said second rotation to said shaft and when said second element is heated said second cord will be heat severed releasing said second torque whereby said first torque imparts said first rotation to said shaft.

4. The apparatus of claim 1 including stop means for limiting the arcuate travel of the other ends of said first and second springs when released.

5. The apparatus of claim 4 wherein said arcuate travel is limited to approximately 135°.

6. The apparatus of claim 1, 8 or 9 wherein said attaching means comprises an elongated bar supported in relatively fixed spaced relation to said shaft and parallel to and coplanar with said axis;
    said one end of said one spring being hooked about a longitudinal edge of said bar and said one end of said second spring being hooked about an opposite longitudinal edge of said bar whereby the torques applied by said qprings to said bar and shaft are opposing.

7. Motor apparatus comprising
    an elongated motor shaft having a shaft axis;
    first means for supporting said shaft for rotation about said axis;
    second means for applying a first torque in a first rotational direction to said shaft;
    third means for applying a second torque in a second rotational direction to said shaft;
    fourth means for selectively releasing the torque of at least one of said second and third means to impart rotation to said shaft;
    said second means comprises a first coil spring and said third means comprises a second coil spring, said shaft being insertable through the coil of said springs; attaching means for attaching one end of each said spring in rotationally driving relation to said shaft.

8. The apparatus of claim 7 wherein said second and third means each apply a spring torque to said shaft.

9. The apparatus of claim 7 wherein said fourth means comprises first and second heater elements mounted in fixed relation to said first means, each heater element adapted to be heated selectively; a first flexible heat severable cord attached between said first means and said second means for maintaining said first torque on said shaft; a second flexible heat severable cord attached between said first means and said third means for maintaining said second torque on said shaft;
    said first cord being in close proximity to said first heater element and said second cord being in close proximity to said second heater element whereby when said first element is heated said first cord will be heat severed releasing said first torque and said second torque imparts said second rotation to said shaft and whereby said second element is heated said second cord will be heat severed releasing said second torque and said first torque imparts said first rotation to said shaft.

10. Motor apparatus comprising
    an elongated motor shaft having a shaft axis;
    first means for supporting said shaft for rotation about said axis;
    second means for applying a first torque in a first rotational direction to said shaft;
    third means for applying a second torque in a second rotational direction to said shaft;
    fourth means for selectively releasing the torque of at least one of said second and third means to impart rotation to said shaft;
    said fourth means comprises first and second heater elements mounted in fixed relation to said first means, each heater element adapted to be heated selectively; a first flexible heat severable cord attached between said first means and said second means for maintaining said first torque on said shaft; a second flexible heat severable cord attached between said first means and said third means for maintaining said second torque on said shaft;
    said first cord being in close proximity to said first heater element and said second cord being in close proximity to said second heater element whereby when said first element is heated said first cord will be heat severed releasing said first torque and said second torque imparts said second rotation to said shaft and whereby when said second element is heated said second cord will be heat severed releasing said second torque and said first torque imparts said first rotation to said shaft;
    said second means comprises a first coil spring and said third means comprises a second coil spring, said shaft being inserted through the coils of said springs; attaching means for attaching one end of each spring in rotationally driving relation to said shaft; the other ends of said first and second springs being tied by said first and second cords respectively to maintain said first and second torques whereby when said first and second cords are heat severed by said elements said first and second torques respectively will be released.

11. Motor apparatus comprising
an elongated motor shaft having a shaft axis;
first means for supporting said shaft for rotation about said axis;
second means for applying a first torque in a first rotational direction to said shaft;
third means for applying a second torque in a second rotational direction to said shaft;
fourth means for selectively releasing the torque of at least one of said second and third means to impart rotation to said shaft;
said fourth means comprises first and second heater elements mounted in fixed relation to said first means, each heater element adapted to be heated selectively; a first flexible heat severable cord attached between said first means and said second means for maintaining said first torque on said shaft; a second flexible heat severable cord attached between said first means and said third means for maintaining said second torque on said shaft;
said first cord being in close proximity to said first heater element and said second cord being in close proximity to said second heater element whereby when said first element is heated said first cord will be heat severed releasing said first torque and said second torque imparts said second rotation to said shaft and whereby said second element is heated said second cord will be heat severed releasing said second torque and said first torque imparts said first rotation to said shaft;
said first cord is wound about said first heater element and said second cord is wound about said second heater element.

12. Motor apparatus comprising
an elongated motor shaft having a shaft axis;
first means for supporting said shaft for rotation about said axis;
second means for applying a first torque in a first rotational direction to said shaft;
third means for applying a second torque in a second rotational direction to said shaft;
fourth means for releasing the torque of said second means to impart rotation to said shaft;
said fourth means comprises a heater element adapted to be heated selectively; a flexible heat severable cord attached between said first means and said second means for maintaining said first torque on said shaft; a tensioned member attached between said first means and said third means for maintaining said second torque on said shaft;
said cord being in close proximity to said heater element whereby said element is heated said cord will be heat severed releasing said first torque whereby said second torque imparts said second rotation to said shaft;
said second means comprising a coil spring;
said shaft being inserted through the coil of said spring;
attaching means for attaching one end of said spring in rotationally driving relation to said shaft; the other end of said spring being tied by said cord to maintain said first torque whereby when said cord is heat severed by said element said first torque will be released.

* * * * *

UNITED STATES PATENT AND TRADEMARK OFFICE
CERTIFICATE OF CORRECTION

PATENT NO. : 4,494,024
DATED : January 15, 1985
INVENTOR(S) : Gerald W. Braun

It is certified that error appears in the above—identified patent and that said Letters Patent is hereby corrected as shown below:

Col. 1, l. 29 before "a" insert --therewith--;
Col. 3, ll. 20, 21 delete ", in the sonobuoy 20";
Col. 4, ll. 20-23 delete ", when sonobuoy 20 is immersed in salt water by flooding a salt water activated battery, not shown, with sea water electrolyte as is known in the art";
Col. 5, l. 44 for "1" read --7--;
Col. 5, l. 49 for "1" read --7--;
Col. 5, l. 57 for "qrings" read --springs--.

Signed and Sealed this

Ninth Day of July 1985

[SEAL]

Attest:

DONALD J. QUIGG

Attesting Officer     Acting Commissioner of Patents and Trademarks